Nov. 30, 1954  J. E. JENDRISAK  2,695,476
APPARATUS FOR SHAPING GLASS SHEETS
Filed Dec. 5, 1950  4 Sheets-Sheet 1

Inventor
Joseph E. Jendrisak
By Nobbe & Swope
Attorneys

Nov. 30, 1954 J. E. JENDRISAK 2,695,476
APPARATUS FOR SHAPING GLASS SHEETS
Filed Dec. 5, 1950 4 Sheets-Sheet 2
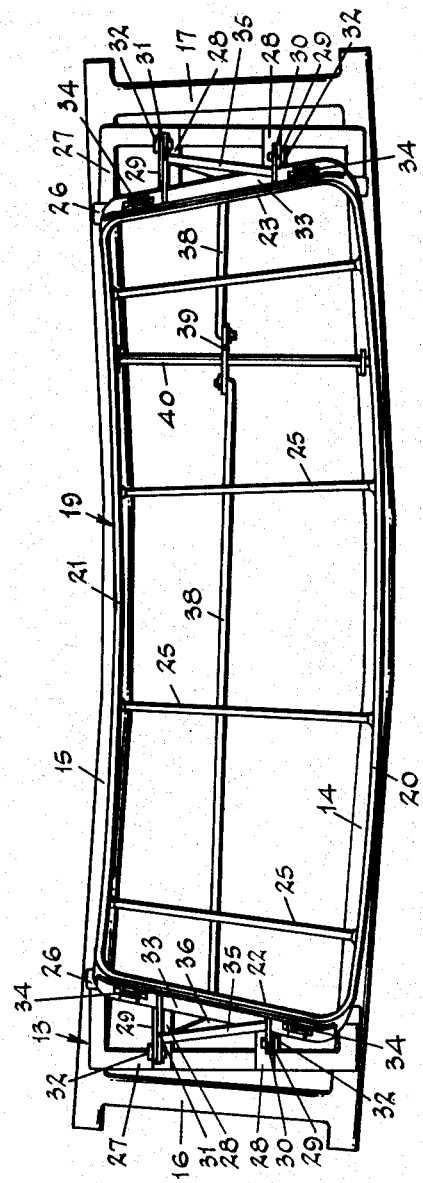
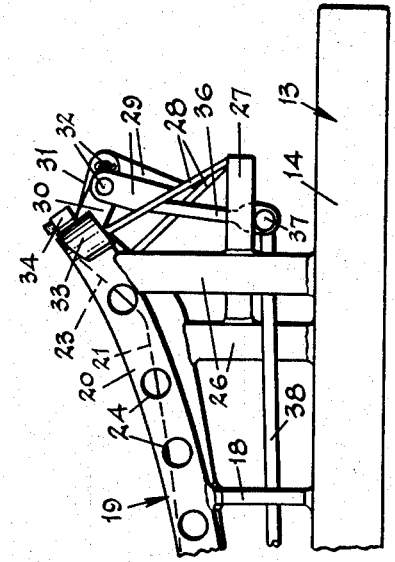
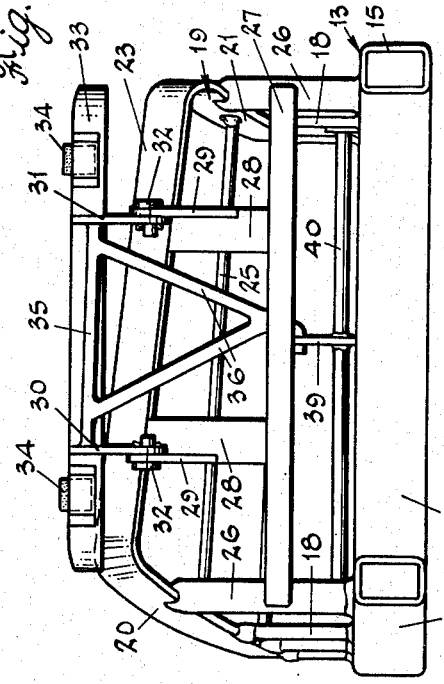
Inventor
Joseph E. Jendrisak
By Nobbe & Swope
Attorneys Nov. 30, 1954  J. E. JENDRISAK  2,695,476
APPARATUS FOR SHAPING GLASS SHEETS
Filed Dec. 5, 1950  4 Sheets-Sheet 3
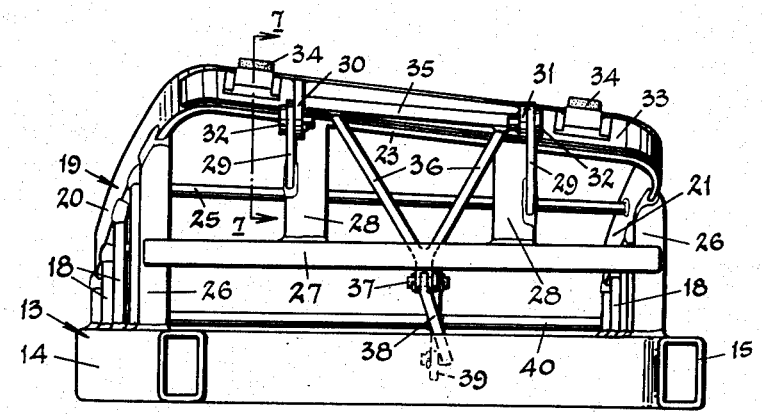
Fig. 6
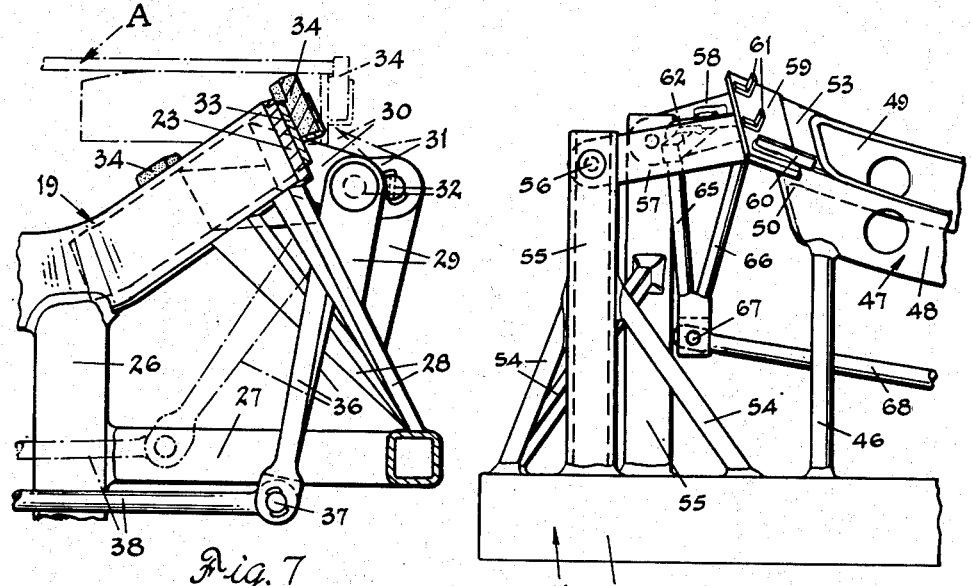
Fig. 7
Fig. 12
Fig. 8
Inventor
Joseph E. Jendrisak
By Nobbe & Swope
Attorneys

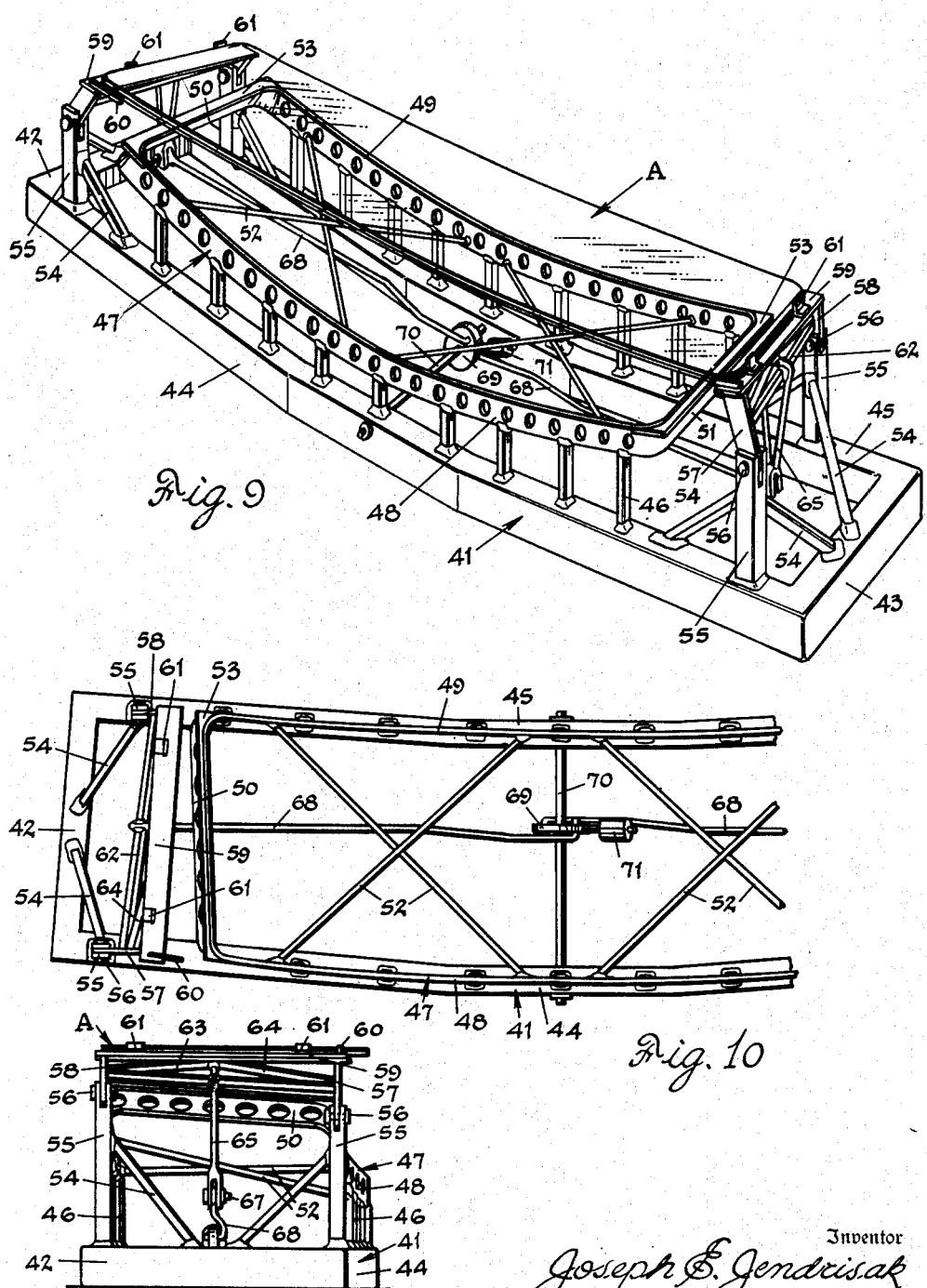

United States Patent Office 2,695,476
Patented Nov. 30, 1954

2,695,476

APPARATUS FOR SHAPING GLASS SHEETS

Joseph E. Jendrisak, Rossford, Ohio, assignor to Libbey-Owens-Ford Glass Company, Toledo, Ohio, a corporation of Ohio Application December 5, 1950, Serial No. 199,215

9 Claims. (Cl. 49—67)

This invention relates broadly to glass bending apparatus and more particularly to an improved type of bending mold which is provided with a skeleton or peripheral shaping surface conforming to the curvature attained by the glass sheet or plate upon completion of the bending thereof.

In the production of bent glass for use in windows it is often imperative that such glass have visual qualities comparable to a flat glass sheet, and thus in the bending operation, such defects as local distortions, surface imperfections and strains are at all times to be avoided. To substantially eliminate these difficulties it has been found desirable that the glass sheet or plate be supported at its marginal areas only and that said sheet be directively lowered onto the shaping surface in a manner whereby marring or scratching of the glass sheet caused by sliding of said sheet on said surface is avoided.

Experience has indicated that one manner in which these last-mentioned difficulties may be almost entirely eliminated is to exert bending forces on the glass which will cause it to conform to the desired bend or curvature before it is of a plasticity or softness whereby it will sag of its own weight onto the shaping surface. That is to say, by the provision of predetermined bending forces the glass sheet or plate is forced into the desired final bend and caused to conform to the curvature of the shaping surface prior to the time at which the temperature of said glass reaches that point at which the glass will sag longitudinally by its own weight. Herein these bending forces are directly applied by pivoted support members which carry the unbent glass sheet or plate in bending relation to the mold and apply forces longitudinally of the glass sheet whereby the desired curvature may be effected without breakage of said sheet. To assure that as the glass settles upon the shaping surface there will be no undesirable sliding thereupon, the movement of the pivoted members is accurately controlled and synchronized.

According to this invention, a pair of pivoted glass sheet support members, arranged at each end of the mold, are so interconnected by a linkage that the movements of said members are synchronized and are generally symmetrical with respect to the shaping surface. Synchronization of the pivoted members has been found to be of particular importance where the curvature of the shaping surface of the mold is obtained by employing radii of differing length, for example, when one longer side of the glass sheet is bent to conform to the arc of a shorter radius than that arc to which the opposite longer side will conform when bent. The glass sheet, in other words, when removed from the mold, will have assumed the characteristics of a conical surface. When producing this type of bent glass, it is desirable that a longitudinal force be applied against the ends of the glass sheet and thus promote the bending of the sheet without subjecting the sheet to a temperature at which it might sag longitudinally of its length. By pivoting these support members on axes that are near and slightly below the ends of the shaping surface, such members act as toggle links and by approaching in line, exert forces longitudinally of the mold.

Thus in the bending of a glass sheet, which in its unbent condition is supported above the shaping surface on the pivoted members, the sheet of glass acts as a horizontal column or strut that is subjected to longitudinal compression forces. As the glass is heated and softens, the bending moment exerted by its weight, which moment is a maximum at the center of the glass, causes the glass to sag and fail as a column in compression. As the glass sheet softens and sags toward the shaping surface, it not only becomes necessary to effect a suitable support for the desired synchronized endwise movement, but also to make provision in this supporting arrangement for an increased extent of movement along one side in order that the ends of the sheet, when it is finally bent, will be adequately disposed with respect to the complementary end portions of the shaping surface.

As is apparent from the foregoing, in the formation of compound curved glass a high degree of accuracy in the bending operation must at all times be maintained. Especially is this so in the production of compound curved laminated safety glass for automotive windshields. Thus, not only must the product of the bending operation exactly conform to the curved window opening in the vehicle, but since the two glass sheets to be used in laminated safety glass are bent prior to the laminating process, both sheets must be curved simultaneously or in unison whereby each not only conforms to the shaping surface but also conforms to the curvature of the other with the result that a void-free bond will be attained by the laminating process.

To explain further, in the use of peripheral or skeleton mold shaping surfaces it is essential that the glass when completely curved conform in detail to the shaping surface, which in turn is of the exact size and curvature of the window opening to be glazed. To accomplish this objective, according to to the present invention, a glass sheet or plate of a predetermined irregular size is carried above the shaping surface and by means of pivoted support members, other features herein disclosed and the application of longitudinal forces on the ends of the glass sheet, said irregular or non-rectangular sheet is directively lowered and caused to exactly conform to the curved shaping surface. Such exact conformity is of particular importance when the curve or bend is of the compound type. That is to say, should a glass sheet which has assumed the characteristics of a cylindrical surface or is curved along only one radius fail to exactly conform to the shaping surface, this sheet because of its simple curvature will still properly fit within the window opening. However, as to compound curved glass, should one end of the sheet overhang the shaping surface and the other end thereof be disposed short of said surface, said sheet will be a complete misfit as to the window opening and cannot be adjusted thereto.

It is therefore an object of the invention to provide a bending mold wherein the shaping surface is of the skeleton or peripheral type, said shaping surface being of non-rectangular outline and comprising elevated side and end members, the side members being of unequal length with respect to each other and the end members being obliquely and downwardly disposed to form with the side members a continuous shaping surface whereby there may be formed thereupon a conically curved or bent glass sheet or plate.

Another object of the invention is to provide a glass bending mold having pivoted supports that are arranged to carry a flat sheet of glass above the shaping surface of a mold and to directively lower the glass onto the shaping surface during the bending operation with a minimum of sliding of said glass sheet on said shaping surface.

Another object of the invention is to provide means carried by the support members which upon the reception of the flat glass sheet prior to bending thereof are disposed obliquely to the ends of the mold shaping surface, but which, upon completion of the bending cycle and settlement of the sheet upon the shaping surface, coincide with the ends of said surface.

A further object of the invention is in the provision of a pivotal linkage arrangement for the glass sheet support members whereby the glass contacting portion associated with each pair of pivoted support members will remain in alignment with and abut upon the end edges of a non-rectangular glass sheet at any stage of the bending operation.

Another object of the invention is in the provision of synchronizing means between the pivoted glass sheet support members so that the supports will simultaneously operate to direct the glass sheet to its intended position on the shaping surface of a mold.

A still further object of the invention is in the provision of a rotatable lever plate connected to the pivoted support members of a bending mold which by its rotation and connection to the support members interjoins them in synchronized relation as they move to deposit a sheet of glass onto the shaping surface of a mold.

Other objects and advantages of the invention will become more apparent during the course of the following description when taken in connection with the accompanying drawings.

In the drawings, wherein like numerals are employed to designate like parts throughout the same:

Fig. 2 is a plan view of the mold;

Fig. 4 is an end elevation of the mold showing the pivoted support members in upward position;

Fig. 5 is a fragmentary elevation of the mold;

Fig. 6 is an end elevation of the mold showing the pivoted support members in downward position;

Fig. 7 is a sectional view taken on the line 7—7 of Fig. 6;

Fig. 8 is a graphic view showing the relative movement of the ends and sides of the glass sheet as it is caused to assume the desired bend;

Fig. 9 is a perspective view of a modified form of the invention;

Fig. 10 is a plan view of one end of the modified form;

Fig. 11 is an end view of the modified form of the invention; and

Fig. 12 is a fragmentary elevation of the modified form.

Figure 1:
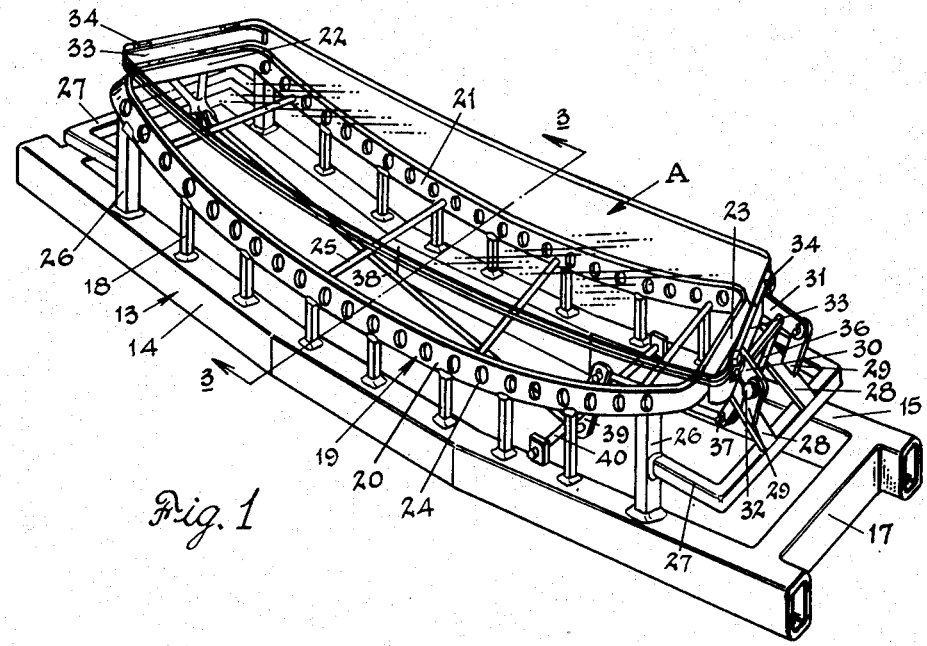
Fig. 1 is a perspective view of a bending mould constructed in accordance with the invention.

Referring to Fig. 1, wherein is illustrated one form of mold embodying the invention, there is provided a substantially rectangular base framework 13 which in plan conforms to the outline of a glass sheet to be bent. This framework is preferably constructed of rectangular cross-section tubing arranged to provide longitudinal base members 14 and 15 and transverse base members 16 and 17. Erected on the longitudinal members are a plurality of posts or pedestals 18 which carry upon their upper ends a relatively thin mold strip 19. This strip, the upper end of which constitutes the shaping surface of the ring type mold, conforms in size and shape to the outline of the glass sheet in its finally bent or curved form, that is, upon completion of the bending operation to be hereinafter described.

The mold strip 19, which upon its upper end presents a smooth continuous shaping surface, comprises longitudinal strip members or sections 20 and 21 and transverse strip members or sections 22 and 23. As may be seen in Fig. 1, the longitudinal strip members 20 and 21 are each elevated from the base framework 13 an equal distance throughout the greater portion of their lengths. That is to say, the central portions of the members 20 and 21 are preferably carried at equal heights above the framework 13. However, in order to provide a shaping surface suitable for the formation of a conically curved or bent glass sheet the longitudinal strip member 20 is of greater length than the opposite strip member 21 and the ends of said member 20 are disposed at a greater height from the base framework 13 than the ends of said opposite longitudinal strip member 21. In addition, as may be seen in Figs. 2 and 4, the transverse strip members 22 and 23 are disposed inwardly from the ends of the base framework or at an angle oblique to the transverse base members 16 and 17 of the framework 13. Further, in order to provide a shaping surface of the desired conical curvature, the transverse strip members 22 and 23 are also arranged downwardly with respect to the ends of the base framework or at an angle from the horizontal oblique to the transverse base members 16 and 17 of the framework 13.

Thus it will be seen that there is herein provided a mold strip or shaping surface conforming to the desired curvature of the glass sheet or plate upon completion of the bending operation. As above described the conically curved mold strip herein provided is attained by providing longitudinal strip members or sections of unequal length, elevating the ends thereof at a greater height with respect to each other and in relation to the central portion of each member, and by arranging the transverse strip members oblique to both the horizontal and vertical. It will of course be appreciated that although the present invention is herein described with particular reference to the production of conically curved glass sheets or plates, it is not restricted to this type of curve and that by appropriate alteration of the hereinafter detailed apparatus, the principle of the invention may be applied to the formation of other types of curves, such as spherical bends.

As is shown in Fig. 1, the mold strip 19 is preferably provided with suitably spaced holes 24 which serve to hasten the transmission of heat through said strip and thereby allow the shaping surface to reach the same temperature as the glass being bent. If desired, the mold strip 19 may be strengthened by a plurality of cross members 25.

Extending upwardly from the longitudinal base members 14 and 15 and inwardly of the opposite ends of the strip 19 are uprights 26, which preferably are of greater diameter or thickness than the posts 18. These uprights not only serve to support the strip 19, but also provide means to which may be attached a structure suitable for carrying the pivoted support members and related means. Thus, suitably attached to said uprights 26 and extending perpendicularly rearwardly therefrom below the transverse strip members 22 and 23 of the mold strip 19 is an intermediate base or bracket 27 from which struts 28 extend diagonally upwardly to the under surfaces of the transverse strip members 22 and 23.

Carried upwardly from said struts 28 are stationary support members 29 which are connected to each of the pivoted support members 30 and 31 by pivoted connections 32.

As may be seen in Figs. 1 and 4, the pivoted support members 30 adjacent the longitudinal strip member 20 of the mold strip 19 are of lesser length than the support members 31 adjacent the longitudinal member 21 of said strip. As will be subsequently explained, this difference of length of the support members provides means whereby the unbent glass sheet may be carried above the shaping surface, prior to bending, at an angle oblique to the ends of said surface and whereby during the bending operation the side of the glass sheet of proposed greater curvature will be forced to traverse a longer arc than the opposite side of said sheet. By this means, and the means to be hereinafter described, the glass sheet upon completion of the bending operation will conform to the conically curved shaping surface.

Attached to the opposite ends of each pair of pivoted members 30 and 31 is a glass sheet engaging surface or contacting portion 33 which conforms to the curvature of the end of the mold strip 19 and is provided with locating fingers 34. The glass sheet engaging surface 33 is also preferably of a height less than the distance between the upper and lower surfaces of the ends of the mold strip so that when the pivoted support members 30 and 31 complete their descent from the vertical position shown in Figs. 3 and 4, the upper surface of each glass engaging surface 33 will be slightly below the upper surfaces of the transverse strip members 22 and 23 of the mold strip and the locating fingers 34 will be the only protuberances above said strip members. As will be more fully hereinafter explained, this arrangement allows the glass sheet A, which is shown in Fig. 1 supported upon the engaging surfaces or portions 33 and abutting upon the locating fingers 34, to accurately settle onto the shaping surfaces of the mold without undesirable sliding on any portion thereof.

To assure that both glass sheet engaging surfaces 33 descend at the same relative speed and reach their final positions at substantially the same instant, thereby also substantially precluding any possibility that a greater force will be exerted on only one end of the glass sheet, a novel synchronization arrangement is herein provided. Thus, as is shown in Figs. 5 and 6, there is attached to the pivoted support members 30 and 31 a rod 35, to the opposite ends of which are also secured arms 36, said arms terminating in a linkage 37. Extending horizontally from the linkage are linkage rods 38 which are connected to a lever plate 39 rotatable upon a cross-shaft 40 extending between and secured to the longitudinal base members 14 and 15 of the base framework 13. It is to be here noted, as may be seen in Figs. 1 and 2, that the ends of the flat preferably non-rectangular glass sheet A when supported upon the glass sheet engaging surfaces 33 prior to the bending operation are disposed obliquely with respect to the transverse strip members 22 and 23 of the mold strip 19 or shaping surface to which the sheet will finally conform. That is, the uprights 26 on the longitudinal base member 14 are not in line with the uprights on the longitudinal member 15 and the intermediate bases or brackets 27 are not in vertical alignment with the ends of the mold strip 19. As will be more fully hereinafter explained, this particular arrangement has the advantage that an equal amount of force is exerted entirely across the ends of the glass sheet by the sheet engaging surfaces 33 through the locating fingers 34 as one side surface of the glass sheet traverses a longer arc than the opposite side surface to attain the desired conical bend. However, due to the location of the pivoted support members 30 and 31 with respect to the shaping surface, there is exerted upon the ends of the glass sheet longitudinal forces sufficient to directively lower and bend said sheet, but not of an amount whereby the sheet would be cracked or broken during the bending thereof.

Figure 3:
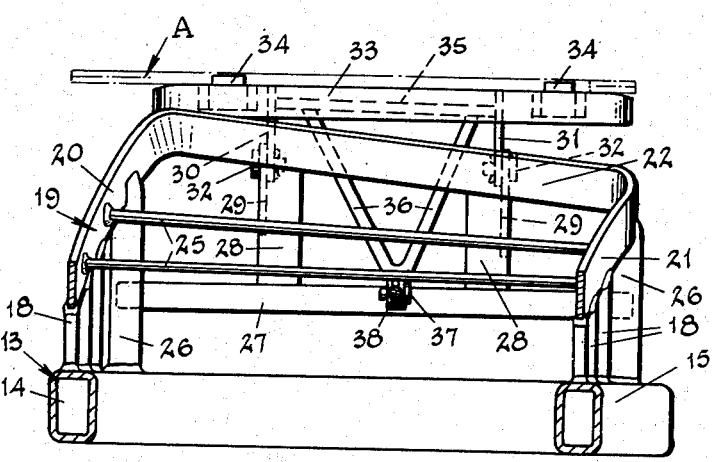
Fig. 3 is a vertical transverse section taken on the line 3—3 of Fig. 1.

In practicing the invention the pivoted support members 30 and 31 are raised upwardly to a substantially vertical position, as shown in Figs. 3 and 4, and a preferably non-rectangular sheet of glass A positioned whereby the ends thereof rest upon the glass sheet engaging surfaces or portions 33 and abut upon the locating fingers 34.

As the glass sheet is thus supported prior to passing through a suitable bending furnace it acts as a horizontal column or strut which is substantially in a condition of equilibrium. That is, although there are longitudinal forces exerted on the ends of the glass sheet by the sheet engaging portions 33 and locating fingers 34, the normal strength and rigidity of the glass is sufficient to overcome these forces and the glass sheet A remains immovable as thus supported.

However, as the glass sheet is heated in the furnace through which the mold is carried, it tends to soften and the moment exerted by the weight of the sheet, which moment is at a maximum at the center of the sheet, causes the sheet to sag downwardly and thus fail as a column in compression. In the absence of any forces exerted longitudinally of the glass sheet, it may be expected that the sheet would bend substantially in the central portion of its longitudinal axis. In the present invention, however, there are exerted forces longitudinally of the glass sheet upon the opposite ends thereof which oppose, and to a certain degree, overcome the moment of the forces exerted by the weight of the sheet itself.

These longitudinal forces, which are exerted by the glass sheet engaging surfaces 33 and locating fingers 34 as the pivoted support members 30 and 31 progress from a substantially vertical to a substantially horizontal position, are caused by the relative position of the engaging surfaces 33 with respect to the ends of the mold strip 19 or shaping surface, said position being produced by the provision of pivoted support members 30 and 31 of unequal length, and the location of the pivotal connections 32 on line with or slightly below the ends of the mold strip. Thus, when the pivoted support members 30 and 31 are in a substantially vertical position, as they are when receiving a sheet of glass A, the sheet engaging surfaces 33 are disposed oblique to the transverse strip members or sections 22 and 23 of the mold strip and substantially in vertical alignment with the intermediate bases or brackets 27 below. In addition, when said pivoted members 30 and 31 are in the upward position indicated in Figs. 3 and 4, the engaging surfaces 33 are not horizontally parallel with said transverse strip members 22 and 23. In other words, since one end of each transverse strip member is disposed lower than the opposite end of each said member to provide a conical shaping surface, when the glass engaging surfaces 33 are in their upward position (Fig. 3) one side thereof is in closer proximity to the higher side of the mold strip than the other side of the engaging surface is to the lower side of said strip. That is to say, viewing the mold from one end, as in Fig. 4, when the pivoted support members 30 and 31 are raised upwardly and outwardly to the vertical position shown, said members being of unequal length as has been noted, the glass sheet engaging surfaces 33 form an acute angle with the transverse strip members 22 and 23 and are substantially parallel with the intermediate bases or brackets 27 and transverse base members 16 and 17 of the framework 13.

Thus, as the glass sheet A mounted upon the raised sheet engaging surfaces 33 progresses through a suitable furnace and reaches bending temperature, it tends to sag longitudinally of its own weight and simultaneously the engaging surfaces 33 and locating fingers 34 exert forces longitudinally of the sheet due to the downward and inward movement of the pivoted support members 30 and 31.

In the formation of a conical bend, as has been noted, it is essential that one side of the glass sheet be bent or curved to a greater extent than the opposite side of said sheet. The relative distance which each side of the glass travels during the bending cycle is indicated in Fig. 8 wherein the glass sheet A, prior to bending thereof is indicated by the phantom lines, line a—b representing the side of proposed greater curvature and line c—d the opposite side. In the same figure, the conically bent or curved sheet is shown by the solid dark lines while the letters e and f represent the pivotal connections 32 associated with the pivoted support members 30 and the letters g and h the pivotal connections 32 of the pivoted members 31.

With reference now to the drawings, it will be seen that as the glass sheet A progresses downwardly from the substantially vertical position shown in Figs. 3 and 4, due to the exertion of longitudinal forces on the ends of said sheet, the side a—b (Fig. 8) will descend downwardly at a faster rate and be curved more severely than the opposite side c—d so that upon completion of the bending operation each side of the glass sheet will meet and conform to its respective longitudinal strip member of the mold strip 19 at substantially the same instant, thereby precluding any undesirable sliding of the glass sheet on said strip. As has been noted above, this substantially simultaneous settlement of all marginal portions of the glass sheet upon the shaping surface of the mold it attained by the synchronized action of the lever plate 39, linkage rods 38, linkages 37 and arms 36 joined to the pivoted support members 30 and 31.

A modified form of the above invention is shown in Figs. 9 to 12 and upon reference thereto it will be seen that there is provided a base framework 41 which is substantially the same as the one above described. That is, said framework comprises transverse base members 42 and 43 and longitudinal base members 44 and 45 interconnected at their ends to provide a framework conforming generally to the outline of the finally curved or bent glass sheet.

Supported upon a plurality of posts 46, which are erected from the longitudinal and transverse base members, is a mold strip 47. This strip, the upper end of which constitutes the shaping surface, is of the same general shape and curvature as the mold strip 19 above described and comprises longitudinal strip members or sections 48 and 49 and transverse strip members or sections 50 and 51. If desired, additional rigidity may be imparted to the strip by cross members 52 extending between the strip members 48 and 49.

As was also noted above and as may be best seen in Figs. 10 and 12, the transverse strip members 50 and 51 are not in vertical alignment with the transverse base members 42 and 43 of the framework 41, but rather, are obliquely disposed thereto. In addition, the ends of said strip members adjacent the longitudinal strip member 48 are disposed downwardly thereto to provide a shaping surface of the desired conical curvature. If desired, as shown in Fig. 9, the longitudinal strip member 49, that is, that member upon which the side of the glass sheet of greater curvature will finally rest, may be carried lower than the opposite longitudinal member 49. Or, said longitudinal member 49 may be elevated to approximately the same height as is shown in Fig. 1 of the other form of the invention. However, regardless of this, the mold strip 47 is constructed in substantially the same manner and provides a shaping surface conforming generally to that attained by the mold strip 19.

Attached to the ends of the mold strip 47 are guide means or plates 53, said means extending outwardly beyond the ends of the shaping surface as continuations thereof. It has been found desirable, in order to assure that the guide plates are contoured extensions of the shaping surface, that said plates be attached before said surface is machined to final form and the same machine that contours the shaping surface will thus contour the guide plates.

Erected from the longitudinal base members 44 and 45 and braced by suitable struts 54 are uprights 55. Linked to said uprights by pivotal connections 56 are the pivoted support members 57 and 58, the pivoted members 57 adjacent the longitudinal strip member 48 being of greater length than the opposite pivoted members 58.

Attached to the opposite ends of the pivoted support members 57 and 58 are movable guiding members 59 (Fig. 12), said latter members being provided with marginal engaging means 60 and locating fingers or stops 61 for defining the location of the ends of the glass sheet on the guide members 59 prior to and during bending.

To assure that a substantially equal amount of force will be exerted on both ends of the glass sheet and that thereby each end of said sheet will descend downwardly at the same speed, the movement of the pivoted support members 57 and 58 is synchronized. Thus, extending horizontally and laterally between said members are braces 62, and extending diagonally upwardly from the support members to the guiding members are additional braces 63 and 64. As may be seen in Figs. 11 and 12, there is attached to the brace 62, and braces 63 and 64 at the juncture thereof, a downwardly directed arm 65. Connected to the movable guiding members 59 and also extending downwardly is another arm 66, the latter being coupled with the arm 65 by a linkage 67 from which extends rods 68 connected to a disk 69 rotatable upon a shaft 70 that is secured to the longitudinal base members 44 and 45 of the base framework 41.

As the mold is thus constructed, the uprights 55 carried by the longitudinal base member 45 are located at a greater distance inwardly from the transverse base members 42 and 43 than are the uprights which extend upwardly from the longitudinal member 44. Further, it may be seen in Figs. 11 and 12 that the pivoted support members 57 are of greater length than the other pivoted members 58, that the pivotal connections 56 for the members 57 and 58 are substantially in alignment with the respective ends of the shaping surface, and that when the pivoted members 57 and 58 are in the upward position shown in Fig. 10, the movable guide members 59 are obliquely disposed relative to the transverse strip members or sections 50 and 51 of the shaping surface or mold strip 47.

In the operation of this modified form of the invention, a flat preferably non-rectangular glass sheet A is placed upon the movable guiding members 59 whereby the sides of the sheet adjacent the ends thereof contact the marginal engaging means 60 and the ends of said sheet abut upon the locating fingers 61. As thus disposed upon the vertically positioned pivoted support members 57 and 58, the glass sheet is held substantially rigid. That is, by providing pivoted members of unequal length, arranging the pivotal connections on line with the ends of the mold strip and disposing the uprights not in line, there are exerted forces upon the ends of the glass sheet A whereby it is rendered immovable upon the guiding members 59 prior to being bent. However, if it is desired that a slightly greater force be exerted on the ends of said sheet during bending thereof, a weight 71 may be suitably mounted upon the disk 69. Thus, by the downward or clockwise movement of said weight an additional force will be transferred to the pivoted members 57 and 58.

As the mold, with glass sheet mounted thereupon in the manner noted above, passes through a furnace and reaches bending temperature, the glass sheet tends to bend longitudinally of its length and simultaneously the pivoted members slowly descend downwardly and through the locating fingers 61 exert longitudinal forces on the ends of said sheet which overcome the moment of forces caused by longitudinal sagging of the sheet. During the synchronized downward movement of the pivoted support members 57 and 58 that side of the glass sheet A of proposed greater curvature will be forced to traverse a longer arc than the opposite side of said sheet in order that, when the bending cycle is completed, the more severely bent side of the glass sheet will conform to the curvature of the longitudinal strip member 48 and the side of lesser curvature will conform to the opposite strip member 49.

In the formation of bends or curves of this type it is normal for the central portion of the glass sheet A to contact the central portions or regions of greater curvature of the longitudinal strip members 48 and 49 first, followed by conformity of the remaining areas of said sheet outwardly to the ends thereof upon the desired portions of said longitudinal members 48 and 49 so that, when the bending operation is completed, the guide means or plates 53 will be finally contacted by the movable guiding members 59 and the ends of the glass sheet A deposited upon said guide means. However, inasmuch as there is herein provided synchronizing means and guide means which are contoured extensions of the shaping surface, all marginal areas of the glass sheet contact and settle upon their respective portions of said shaping surface without undesirable sliding and consequent marring of the sheet or plate thereon.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for shaping glass sheets, in combination, a mold strip having a shaping surface conforming to the marginal contour of a bent glass sheet, said strip comprising longitudinal sections of different lengths and transverse sections connecting the longitudinal sections at their ends, pivoted support members mounted outwardly of said transverse sections for swinging movement upwardly and downwardly relative thereto, and means carried by said pivoted members for supporting a flat glass sheet above the shaping surface prior to bending and exerting forces on the ends of said sheet during the bending downwardly thereof, said means being disposed in non-parallel relation to said transverse sections when said pivoted members are in an upward position and substantially parallel with said sections when said members are in their downward position.

2. In apparatus for shaping glass sheets, in combination, a mold strip having a shaping surface conforming to the marginal contour of a bent glass sheet, said strip comprising longitudinal sections of different lengths having the end portions thereof curving upwardly and transverse sections joined at their opposite ends to said longitudinal sections, support members of unequal length pivotally mounted outwardly of said transverse sections for swinging movement upwardly and downwardly relative thereto, and means carried by the support members for supporting a flat glass sheet above the shaping surface in bending relation thereto when said support members are in upward position, said means when so positioned being disposed horizontally and vertically oblique with respect to the transverse sections to receive the flat glass sheet thereon and adapted to exert forces on the ends of said sheet as the support members and said means carried thereby move downwardly to deposit the bent sheet on said shaping surface at which time said means is disposed in substantially parallel relation with said transverse sections.

3. In apparatus for shaping glass sheets, in combination, a mold strip having a shaping surface conforming to the marginal contour of a bent glass sheet, said strip comprising a pair of longitudinal sections of different lengths having the end portions thereof curving upwardly, with the end portions of one section being of a greater height than those of the opposite section and a pair of transverse sections joined at their opposite ends to said longitudinal sections, support members of unequal length pivotally mounted outwardly of said transverse sections for swinging movement upwardly and outwardly and downwardly and inwardly on axes substantially on line with the transverse sections, and means carried by the support members for supporting a flat glass sheet above the shaping surface in bending relation thereto when said support members are in upward and outward position, said means when so positioned being disposed horizontally and vertically oblique with respect to the transverse sections to receive the flat glass sheet thereon and adapted to exert forces on the ends of said sheet as the support members and said means supported thereby move inwardly and downwardly to deposit the bent sheet on said shaping surface at which time said means is disposed in substantially parallel relation with said transverse sections.

4. In apparatus for shaping glass sheets, in combination, a mold strip having a shaping surface conforming to the marginal contour of a bent glass sheet, said strip comprising a pair of longitudinal sections of different lengths having the end portions thereof curving upwardly, with the end portions of one section being of a greater height than those of the opposite section and a pair of transverse sections joined at their opposite ends to said longitudinal sections, a pair of support members pivotally mounted outwardly of said transverse sections for swinging movement upwardly and outwardly and downwardly and inwardly on axes substantially on line with the transverse sections, said members adjacent the longer longitudinal section being relatively shorter than the opposite member of said pair, and a glass contacting portion carried by each pair of members for supporting a flat glass sheet above the shaping surface in bending relation thereto when said support members are in upward and outward position, said glass contacting portions when so positioned being disposed in horizontal and vertical non-parallel relation with respect to the transverse sections to receive the flat glass sheet thereon and adapted to exert longitudinal forces on the ends of said sheet as the support members and said glass contacting portions move inwardly and downwardly to deposit the bent sheet on said shaping surface at which time said portions are brought into contact with and substantially parallel to said transverse sections.

5. In apparatus for shaping glass sheets, a substantially rectangular base, vertical posts carried thereupon, a ring type mold carried upon the upper ends of said posts and having a shaping surface conforming to the marginal contour of a bent glass sheet, said ring mold comprising a pair of curved longitudinal sections and a pair of transverse sections connecting the longitudinal sections at their ends, one longitudinal section being of greater length than the opposite section, supporting brackets carried at the opposite ends of the mold, a pair of support members pivotally mounted upon each bracket and movable upwardly and downwardly relative thereto, said members adjacent the longer longitudinal section being relatively shorter than the opposite member of said pair, a glass contacting portion carried by each pair of members for supporting a flat glass sheet above the shaping surface in bending relation thereto when said support members are in upward position, said glass contacting portions when so positioned being disposed in horizontal and vertical non-parallel relation with respect to the transverse sections to receive the flat glass sheet thereon and adapted to exert longitudinal forces on the ends of said sheet as the support members and said glass contacting portions move downwardly to deposit the bent sheet on said shaping surface, said portions overlapping said transverse sections and the upper edges of the glass contacting portions being disposed below and substantially parallel to the upper edges of the transverse sections when the bent glass sheet is deposited upon said transverse sections, and locating fingers associated with said contacting portions to define the location of the glass sheet upon said portions.

6. In apparatus for shaping glass sheets, a substantially rectangular base, vertical posts carried thereupon, a ring type mold carried upon the upper ends of said posts and having a shaping surface conforming to the marginal contour of a bent glass sheet, said ring mold comprising a pair of curved longitudinal sections of unequal length and a pair of transverse sections connecting the longitudinal sections at their ends, supporting brackets carried at the opposite ends of the mold, a pair of support members pivotally mounted upon each bracket and movable upwardly and downwardly relative thereto, said members adjacent the longer longitudinal section being relatively shorter than the opposite member of said pair, an elongated glass contacting portion carried by each pair of members for supporting a flat glass sheet above the shaping surface in bending relation thereto when said support members are in upward position, said glass contacting portions when so positioned being disposed in horizontal and vertical non-parallel relation with respect to the transverse sections to receive the flat glass sheet thereon and adapted to exert longitudinal forces on the ends of said sheet as the support members move downwardly to deposit the bent sheet on said shaping surface, said portions overlapping said transverse sections and the upper edges of the glass contacting portions being disposed below and substantially parallel to the upper edges of the transverse sections when the bent glass sheet is deposited thereupon, locating fingers associated with said contacting portions to define the location of the glass sheet upon said portions, said fingers protruding above the upper edges of the transverse sections when the elongated portions overlap said sections, and synchronizing means connected to the pivoted support members to cause said members to move downwardly in unison.

7. In apparatus for shaping glass sheets, in combination, a mold strip having a shaping surface conforming to the marginal contour of a bent glass sheet, said strip comprising a pair of longitudinal sections of different lengths having the end portions thereof curving upwardly, with the end portions of one section being of greater height than those of the opposite section and a pair of transverse sections joined at their opposite ends to said longitudinal sections, guide means attached to said transverse sections and extending outwardly therefrom beyond the ends of said shaping surface as continuations thereof, a pair of support members pivotally mounted outwardly of said transverse sections for swinging movement upwardly and outwardly and downwardly and inwardly on axes substantially on line with the transverse sections, said members adjacent the longer longitudinal section being relatively shorter than the opposite member of said pair, and a glass contacting portion carried by each pair of members for supporting a flat glass sheet above the shaping surface in bending relation thereto when said support members are in upward and outward position, said glass contacting portions when so positioned being disposed in horizontal and vertical non-parallel relation with respect to the transverse sections to receive the flat glass sheet thereon and adapted to exert longitudinal forces on the ends of said sheet as the support members and said glass contacting portions move inwardly and downwardly to deposit the bent sheet on said shaping surface at which time said portions are brought into contact with said guide means and substantially parallel with said transverse sections.

8. In apparatus for shaping glass sheets, a substantially rectangular base, vertical posts carried thereupon, a ring type mold carried upon the upper ends of said posts and having a shaping surface conforming to the marginal contour of a bent glass sheet, said ring mold comprising a pair of curved longitudinal sections and a pair of transverse sections connecting the longitudinal sections at their ends, one longitudinal section being of greater length than the opposite section, guide means attached to said transverse sections and extending outwardly therefrom beyond the ends of said shaping surface as continuations thereof, supporting brackets carried at the opposite ends of the mold, a pair of support members pivotally mounted upon each bracket and movable upwardly and downwardly relative thereto, said members adjacent the longer longitudinal section being relatively shorter than the opposite member of said pair, a glass contacting portion carried by each pair of members for supporting a flat glass sheet above the shaping surface in bending relation thereto when said support members are in upward position, said glass contacting portions when so positioned being disposed in horizontal and vertical non-parallel relation with respect to the transverse sections to receive the flat glass sheet thereon and adapted to exert longitudinal forces on the ends of said sheets as the support members and said glass contacting portions move downwardly to deposit the bent sheet on said shaping surface, said portions contacting said guide means and the upper edges of each being flush with the other when the glass sheet is deposited upon said transverse sections, and locating fingers associated with said contacting portions to define the location of the glass sheet upon said portions.

9. In apparatus for shaping glass sheets, a substantially rectangular base, vertical posts carried thereupon, a ring type mold carried upon the upper ends of said posts and having a shaping surface conforming to the marginal contour of a bent glass sheet, said ring mold comprising a pair of curved longitudinal sections of unequal length and a pair of transverse sections connecting the longitudinal sections at their ends, guide means attached to said transverse sections and extending outwardly therefrom beyond the ends of said shaping surfaces as continuations thereof, supporting brackets carried at the opposite ends of the mold, a pair of support members pivotally mounted upon each bracket and movable upwardly and downwardly relative thereto, said members adjacent the longer longitudinal section being relatively shorter than the opposite member of said pair, an elongated glass contacting portion carried by each pair of members for supporting a flat glass sheet above the shaping surface in bending relation thereto when said support members are in upward position, said glass contacting portions when so positioned being disposed in horizontal and vertical non-parallel relation with respect to the transverse sections to receive the flat glass sheet thereon and adapted to exert longitudinal forces on the ends of said sheets as the support members move downwardly to deposit the bent sheet on said shaping surface, said portions contacting said guide means and the upper edges of each being flush with the other when the bent glass sheet is deposited upon said transverse sections, locating fingers associated with said contacting portions to define the location of the glass sheet upon said portions, and synchronizing means connected to the pivoted support members to cause said members to move downwardly in unison.

References Cited in the file of this patent

UNITED STATES PATENTS

| Number | Name | Date |
|---|---|---|
| 2,003,383 | Miller | June 4, 1935 |
| 2,452,488 | Paddock et al. | Oct. 26, 1948 |
| 2,554,572 | Jendrisak | May 29, 1951 |